March 19, 1974 — J. J. PENYAK — 3,798,102
METHOD OF SEALING THE TIP END OF A HELICOPTER ROTOR BLADE SPAR
Filed Aug. 5, 1971
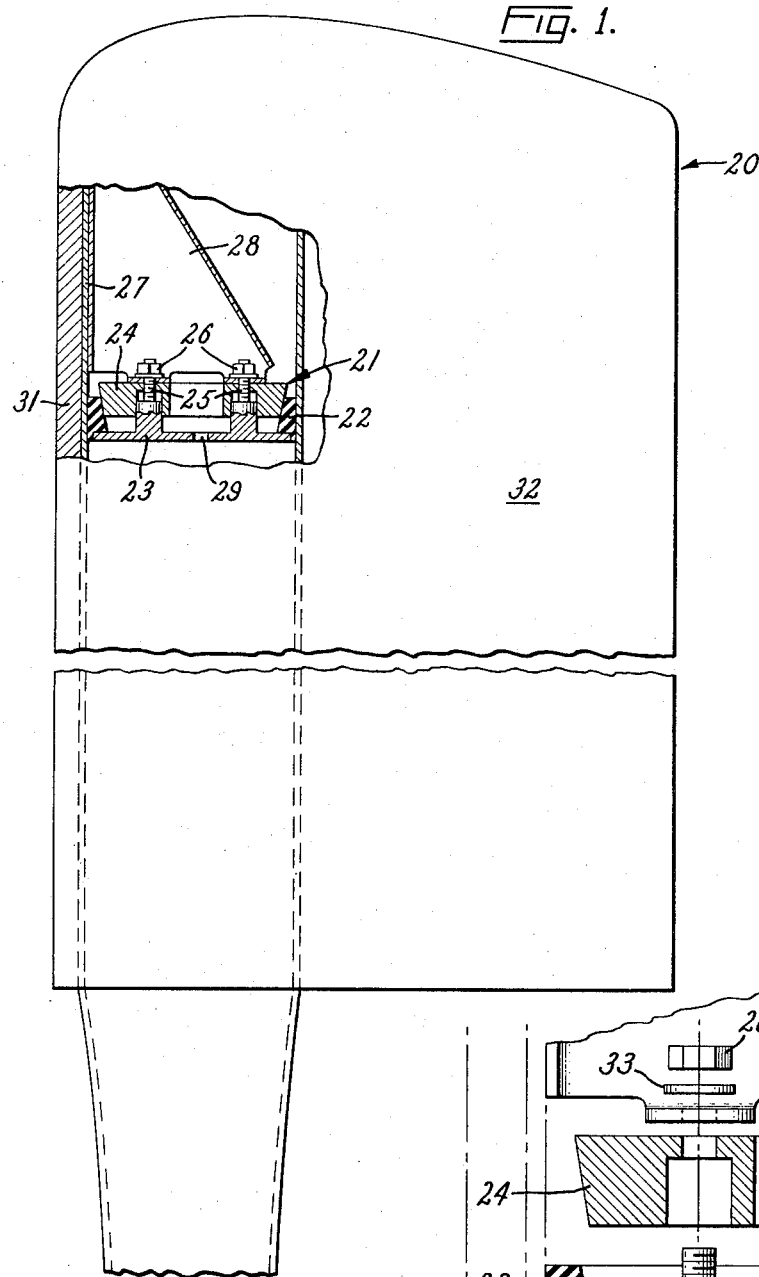
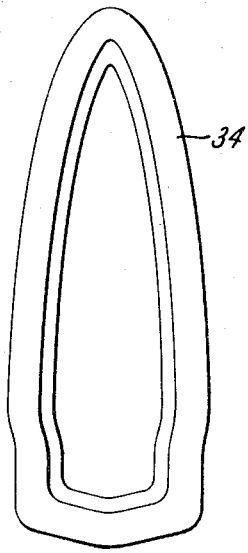
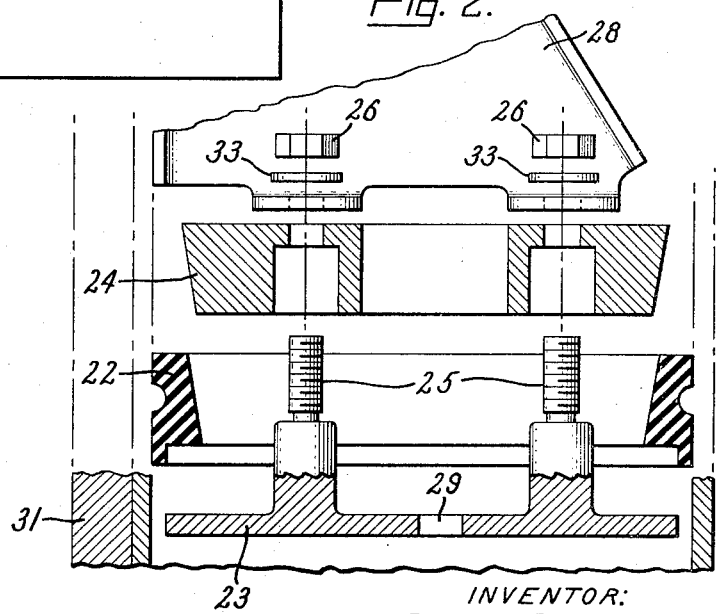
INVENTOR:
JOSEPH J. PENYAK,
BY Joseph M. Corr
ATTORNEY

United States Patent Office 3,798,102
Patented Mar. 19, 1974

3,798,102
METHOD OF SEALING THE TIP END OF A HELICOPTER ROTOR BLADE SPAR
Joseph J. Penyak, Ridley Park, Pa., assignor to The Boeing Company, Seattle, Wash.
Filed Aug. 5, 1971, Ser. No. 169,286
Int. Cl. B29c 27/00, 27/30; B64c 11/16; F03b 3/12
U.S. Cl. 156—214
4 Claims

ABSTRACT OF THE DISCLOSURE

There is disclosed a method of sealing a closure to a container or similar object. As a specific application there is described the method of sealing the tip end of a helicopter rotor blade spar. At the spar tip end there is provided a bulkhead comprising a backing plate and a wedge plate joined together by bolts and conforming to the shape of the spar interior. Surrounding the edges of the bulkhead is the sealant. Prior to inserting the bulkhead and sealant into the spar, the sealant is semi-cured from a liquid state to a molded solid state whereby it can be fitted about the bulkhead plates. After the bulkhead is located in place in the spar, the sealant is further cured to seal the area between the spar and bulkhead. The two-step process of semi-curing the sealant and then finally curing in the sealed position is unique to this invention.

BACKGROUND OF THE INVENTION

This invention relates to a unique method of sealing. A particular application described is the method of sealing a bulkhead in the tip end of a helicopter rotor blade. The seal provided in the helicopter spar permits evacuation or pressurization of the spar. Although the following discussion describes the application of this invention to helicopter rotor blades, this is not to be viewed as limitative of the scope of the invention. Rather, as will be evident herein, the method of sealing disclosed has broad application.

Recently, various inspection methods have been developed for detecting cracks in helicopter rotor blade spars. These methods involve evacuating or pressurizing the spar and sensing pressure changes therein. In turn, this necessitates hermetically sealing the spar at its both ends. The tip end is sealed using a bulkhead and the invention provides a technique for sealing the bulkhead in the spar.

In practice a conventional technique of inserting a bulkhead requires the blade spar to be held vertical in order to assure proper sealing by the sealant. The bulkhead normally consists of two metal plates locked together and sealed in place by a suitable sealant. The sealant is poured in a liquid state around the edges of the bulkhead plates to form a sealing layer between the interior walls of the spar and the bulkhead. If the spar were held horizontally, the sealant would flow unevenly and proper sealing could not be achieved. Because the spar has to be held vertically this causes added expense for tools to hold the spar in place together with longer time and inconvenience in placing the sealant within the spar. For various reasons, therefore, it is desirable to be able to seal the bulkhead in place while the blade is in a horizontal position.

SUMMARY OF THE INVENTION

It is an object of the invention to provide a method of sealing two members together. Thus an object is to provide a method to seal a hollow object or container such as the spar of a helicopter rotor blade. In particular it is an object of the invention accurately to locate and seal a bulkhead within the helicopter spar while the latter is in horizontal position.

An additional object is to provide a means for sealing the bulkhead within the spar wherein the sealant is initially placed in a semi-cured state prior to being inserted into the spar. This semi-cured sealant is placed around the edges of the bulkhead plates and the plates and sealant are inserted as a unit into the spar. The semi-cured sealant is cured in situ in the spar. Such curing can be accomplished externally by the application of heat about the area where the sealant is located inside the spar.

Another object is to provide a technique of assemblying a bulkhead in the tip end of a spar whereby the time and costs associated with the assembly are significantly reduced.

In summary the invention comprises semi-curing a sealant in a mold conforming to the shape of a container to be sealed. The pre-formed, semi-cured sealant tightly fits about the periphery of the container closure. The closure and sealant are then positioned in place on the container. Heat is then applied to the sealant to cure it in situ and thereby seal the container. In particular, the invention provides a unique method of sealing the tip end of a rotor blade. The two-step process of curing the sealant is an important feature of the invention enabling the achievement of the advantages described herein.

BRIEF DESCRIPTION OF THE DRAWINGS

FIG. 1 shows a helicopter rotor blade with a portion cut out exposing the bulkhead.

FIG. 2 is an exploded view of the bulkhead elements.

FIG. 3 is a drawing of the bulkhead seal in its pre-formed, semi-cured state.

DESCRIPTION OF THE PREFERRED EMBODIMENTS

FIG. 1 shows a helicopter rotor blade 20 with a portion cut out near its tip end to expose the bulkhead 21 and seal 22 within the spar. The bulkhead comprises a backing plate 23 and a wedge plate 24 locked together by means of threaded studs 25 and nuts 26. The spar shown as 27 is generally a rounded "D," tubular-shaped metal structure and serves as the main structural element of the blade. Surrounding the periphery of the bulkhead plates is the sealant 22 which seals the bulkhead in the spar. A gusset 28 is shown attached to the bolts of the bulkhead and anchored to the spar. The gusset serves to keep the bulkhead accurately and rigidly at the desired position in the spar.

As mentioned previously, the bulkhead is provided preferably for use in spar inspection systems. In such systems, techniques have been developed either to pressurize or evacuate the area within the hollow interior of the spar and to monitor pressure changes therein for sensing a crack in the spar.

Shown passing through the center of the backing plate 23 is a hole 29 which is provided for receiving an air valve. In the particular embodiment described herein the bulkhead is used in a spar inspection system wherein a liner or bag lines the interior of the spar. The area between the spar and the liner is evacuated while the interior of the liner is at atmospheric pressure. A better understanding of the spar inspection system can be obtained from U.S. Pat. No. 3,667,862 entitled Blade Inspection System and Method, Robert A. Parr, inventor. Therefore, in such a system an air valve is located in the hole 29 in the bulkhead and admits air to the interior of the liner. If it is desired not to use a liner, but to pressurize the spar interior, the air valve could be used as a pressure inlet valve. Of tion system used, the hole 29 may not be present at all in plate 23.

As is evident in the figure, only a portion of the rotor blade is shown with the de-ice blanket appearing at 31 and the trailing edge at 32. Since this invention is directed to the bulkhead, details of the remainder of the blade are not discussed or shown.

FIG. 2 is an exploded view of the bulkhead parts. The plate 23 is shown having threaded studs 25 anchored thereto. As noted above, the backing plate used here has a hole 29 for the purposes described earlier. The wedge plate 24 is shown above the backing plate with holes for the studs to pass through. The washers 33 and nuts 26 which are used to lock the two plates together are shown above the wedge plate. The gusset 28 is also shown having holes provided for the studs to pass through. The backing plate, the wedge plate and the gusset are locked together by the nuts and the threaded studs.

The seal 22 is shown in the semi-cured state and has been preformed in the shape of the bulkhead. This shape, of course, conforms generally to the rounded "D" configuration of the spar. The seal forms a tight fit all around the periphery of the bulkhead so that the final assembly as a unit can be positioned inside the spar.

As apparent from the above two figures, the bulkhead has relatively few parts and because the sealant is in a semi-cured state, the entire assembly is easily handled. With the sealant tightly fitted around the periphery of the bulkhead plates, the assembly is inserted into the spar by a specifically designed tool, which assures that the bulkhead will be placed at the desired location within the spar. Once the assembly is located therein, heat is preferably applied about the exterior of the spar in the area where the bulkhead is located. This heat causes the sealant to be cured completely so that the seal is formed around the bulkhead periphery.

FIG. 3 shows the sealant 34 in the "B" or semi-cured state. As is obvious the sealant is shaped to conform to the spar and is designed to fit tightly around the periphery of the bulkhead plates. While the sealant is in this state it is kept frozen until it is to be used. The sealant is allower to thaw before being fitted around the bulkhead and can easily be handled and manipulated into place. Obviously, the sealant can be molded into any desired shape so that it can be used to seal various shaped closures to their containers.

As is obvious from the figures the bulkhead plates are made of metal and are of sufficient strength to withstand dynamic forces encountered by the rotor blade. The sealant preferably is a low viscosity, chemically curing polyurethane compound. Two such compounds that have been successfully used in this invention are available commercially under the designations PR-1538-T manufactured by Products Research and Chemical Corporation and EC-2181 B/A which is available from the Minnesota Mining and Manufacturing Company.

EXAMPLE I

There will now be described the series of steps which have been practiced in applying this invention using the EC-2181 B/A sealant. As noted previously, an important advantage achieved by the invention is the ability to seal the bulkhead in the spar while the latter is horizontal. Other techniques require the spar to be vertical to prevent run-off of the fluid seal prior to its being cured in place in the spar. Having the spar vertical necessitates added equipment and labor to perform the job. These in turn result in increased costs which are avoided by this invention.

The inner diameter of the spar is primed in the area to be sealed with a suitable primer, preferably the commercially available EC-1945 which is available from the Minnesota Mining and Manufacturing Company which is supplied as a two part unit (accelerator and base) and is mixed on a one-to-one ratio by volume. The primer is air dried for 30 minutes and then force dried for one (1) hour at 180° F. The sealant, EC-2181, is preformed by potting in a mold shaped like the spar and cured to the "B" state for one (1) hour at 200° F. The preformed seal is then fitted around the assembled bulkhead, i.e. the wedge and backing plates. The seal is coated with the EC-1945 prior to inserting the seal and assembled bulkhead.

Upon inserting the assembly, it is accurately located by a suitable tool at the seal area and tightened in place. Heat is then applied about the spar in the seal area at 350° F. for one (1) hour whereby the sealant is cured from the "B" state to its final seal state. A longer curing cycle is possible wherein the sealant is cured at 200° F. for five (5) hours. The gusset can now be connected and anchored to the spar as shown in the figures.

As stated previously an important feature of this invention is the method of two-step curing the sealant, EC-2181 B/A. This is important because it enables the bulkhead to be inserted and sealed in the spar when the latter is horizontal which results in significant cost savings. In addition, in many other applications using this sealant, the ability to preform and store the sealant in the "B" state permits easier handling and a more efficient sealing process. The EC-2181 B/A sealant when semi-cured to the "B" state as noted above can be stored for two (2) days at 85° F. and for thirty (30) days when stored at 20° F. or lower in an evacuated heat sealed bag. Stored seals must first be thawed to 65° F. in the sealed bag before placing it about the bulkhead periphery. The seal should be used within three (3) hours after being removed from the bag and solvent cleaned.

The above example illustrates a technique which has been successfully used in practicing the invention. It has led to satisfactory results wherein the bulkhead is firmly and accurately sealed in the spar. The tip end of the spar can now be closed off with the normal balance weights and tip end as is well known in the industry.

EXAMPLE II

The bulkhead was sealed in the rotor blade using another sealant which is commercially available as PR-1538-T. The commercially available primer PR-420 which is available from Products Research and Chemical Corporation is used with this sealant. The primer is supplied in two part units and is mixed as one (1) part of part A (accelerator) with six (6) parts of part B (base) by volume. The steps described in Example I were repeated except for necessary changes in cure cycles of the sealant. In this instance the sealant was cured to its semi-cured "B" state by placing it in a mold at 180° F. for 30 minutes. The final cure cycle wherein the sealant is cured in situ in the spar is set for one (1) hour at 180° F. Unlike Example I a longer cure cycle is not used when PR-1538-T is the sealant.

What has been described is a particular embodiment of the invention. Modifications and alterations thereto will be apparent to those skilled in the art and are clearly within the spirit and scope of the invention described. The broad usefulness of the sealing procedure described, and in particular the two-step curing process of the sealant will be readily apparent to those skilled in the art. Thus the method described herein can be used to seal two halves of a hollow-body together as well as to seal a closure to its associated container.

When the invention is applied to sealing a bulkhead in the hollow spar of a helicopter rotor blade, the outer contour or periphery of the assembled bulkhead is less than the inner contour of the spar. With the semi-cured sealant tightly fitted about the outer contour of the bulkhead the unit's outer contour is now close to the inner contour of the spar. The result is that the sealant is squeezed between the spar and the bulkhead assembly at the desired position in the spar and is cured thereby sealing the bulkhead to the spar. The bulkhead is aligned parallel to a chordline of the spar to assure accurate positioning thereof.

What is claimed is:

1. A method of sealing the tip end of a helicopter rotor blade spar comprising:
assembling a backing plate and a wedge plate to form a bulkhead assembly having an outside contour less than the interior contour of said spar;

curing a polyurethane compound sealant in a mold to a semicured state;

press fitting said semi-cured sealant around the periphery of said bulkhead assembly;

cleaning the area of said spar to be sealed;

inserting said bulkhead assembly with said semi-cured sealant fitted thereabout into said spar and positioning same at said cleaned area of said spar in alignment with a chordline of said spar; and heating said spar in the area where said bulkhead is located and curing said sealant to a final cured state.

2. The method of claim 1 comprising the additional steps of coating said cleaned area of said spar with a primer and drying said primer prior to inserting said bulkhead and sealant into said spar.

3. The method of claim 1 comprising the additional step of mechanically securing said bulkhead assembly to said spar.

4. A method of sealing the tip end of a helicopter rotor blade spar comprising:

assembling a backing plate and a wedge plate to form a bulkhead assembly having an outside contour less than the interior contour of said spar;

curing a low viscosity polyurethane compound to a semi-cured state in a mold;

press fitting said semi-cured sealant around the periphery of said bulkhead assembly;

cleaning the area of said spar to be sealed;

treating said cleaned area of said spar with a suitable primer and allowing said primer to dry;

inserting said bulkhead assembly with said semi-cured sealant fitted thereabout into said spar and positioning same at said cleaned area of said spar in alignment with a chordline of said spar;

heating said spar in the area where said bulkhead is located and curing said sealant to a final cured state; and securing said bulkhead assembly to said spar by means of a gusset.

References Cited

UNITED STATES PATENTS

| | | | |
|---|---|---|---|
| 2,644,537 | 7/1953 | Meyers | 416—226 |
| 3,103,977 | 9/1963 | Negroni | 416—226 |
| 3,136,369 | 6/1964 | Capowich et al. | 156—69 X |
| 2,648,388 | 8/1953 | Haines et al. | 416—226 X |
| 3,476,625 | 11/1969 | Slivinsky et al. | 416—226 X |
| 3,323,597 | 6/1967 | Longobardi et al. | 416—226 X |
| 3,519,228 | 7/1970 | Windecker | 416—229 UX |
| 2,663,908 | 12/1953 | Maier et al. | 264—DIG 59 |
| 2,767,461 | 10/1956 | Lebold et al. | 416—229 UX |

PHILIP DIER, Primary Examiner

U.S. Cl. X.R.

156—331; 264—336, DIG. 59; 416—223, 229